United States Patent [19]
Wood

[11] 3,939,915
[45] Feb. 24, 1976

[54] SAW GUIDE
[76] Inventor: James W. Wood, 8612 Templeton Drive, Omaha, Nebr. 68134
[22] Filed: Aug. 26, 1974
[21] Appl. No.: 500,384

[52] U.S. Cl. ............ 269/2; 269/87.1; 145/129
[51] Int. Cl.² ........................................ B25B 5/16
[58] Field of Search ................... 83/761–767; 145/129; 269/1, 2, 87, 87.1, 87.2, 87.3, 90, 238, 275

[56] References Cited
UNITED STATES PATENTS

| | | | |
|---|---|---|---|
| 1,855,945 | 4/1932 | Denyer | 83/767 |
| 2,906,303 | 9/1959 | Abel | 83/767 |
| 3,052,461 | 9/1962 | Bateman | 269/275 |
| 3,550,486 | 12/1970 | Edwards | 81/177.8 |
| 3,582,060 | 6/1971 | Carter | 269/2 |

FOREIGN PATENTS OR APPLICATIONS

| | | | |
|---|---|---|---|
| 614,071 | 5/1935 | Germany | 269/2 |

*Primary Examiner*—Roy Lake
*Assistant Examiner*—Mark S. Bicks

[57] ABSTRACT

A saw guide assembly having a straight edge guide means attached to one of a pair of grip levers connected by a bolt and wing nut which latter, when tightened, assures clamping of a work-piece between the guide means and a pressing means such as a spring mounted on the other grip lever.

10 Claims, 6 Drawing Figures

U.S. Patent   Feb. 24, 1976   3,939,915
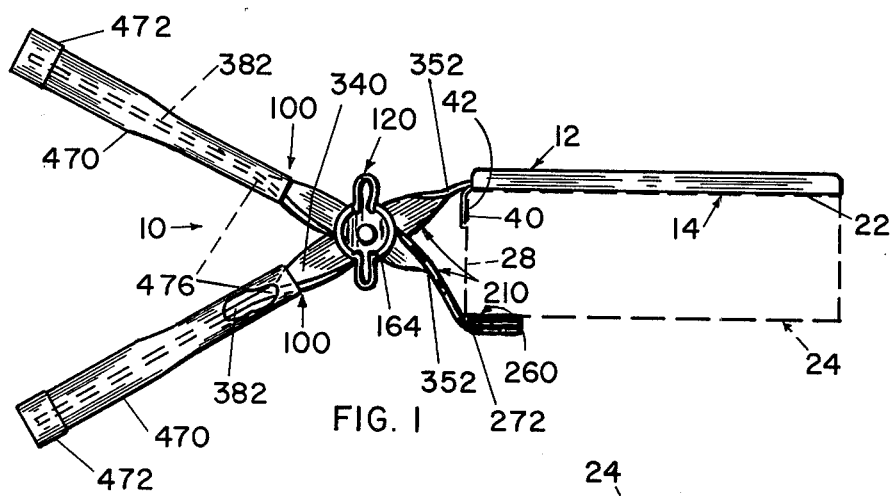
FIG. 1
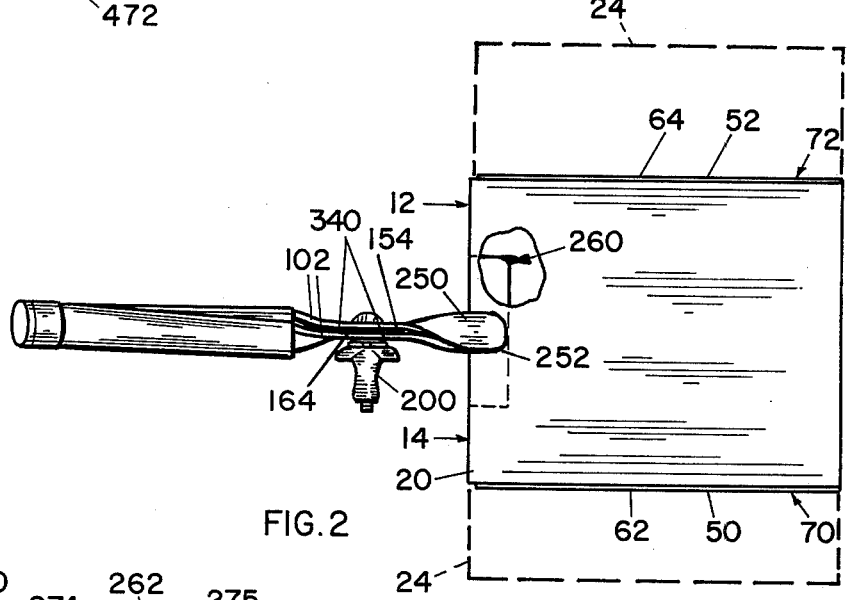
FIG. 2
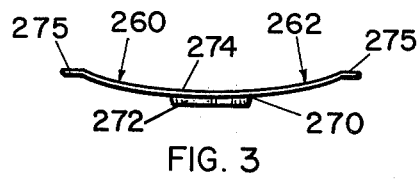
FIG. 3
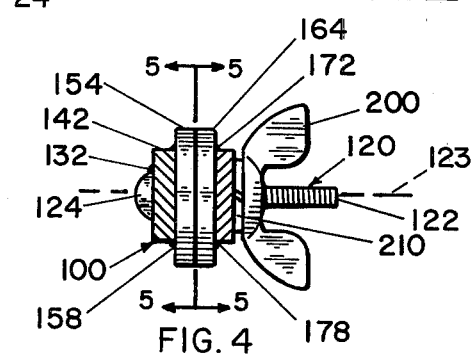
FIG. 4
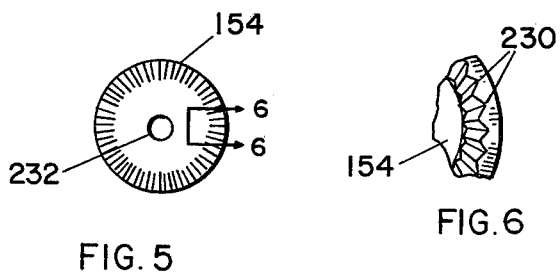
FIG. 5
FIG. 6

SAW GUIDE

FIELD OF THE INVENTION

This invention is in the field of saw guides attachable to work-pieces such as lumber or metal for guiding a saw when the housing of the saw is placed against a guide edge thereof.

DESCRIPTION OF THE PRIOR ART

Workmen have long needed a quickly operating and inexpensive saw guide.

Important as a saw guide can be for assuring a straight cut, yet a saw guide that is cumbersome and costly will, in my opinion, be left unpurchased in preference to the simplicity of sawing to a pencil-mark.

And yet, it is very difficult to do a quantity of sawing with a hand-circular saw without making mistakes, the saw often tending to veer away from a pencil-marked line in a completely hand-operation. This problem is even more complex when the popular saber saws are used. Much work can be ruined.

To prevent ruined work in sawing to a pencilled line, a workman must go very slowly.

Many saw guides have been proposed and patented heretofore.

All have straight edges and all clamp to the work-piece, but the high cost, great bulk, and cumbersomeness of saw guides of the prior art have, in my opinion, been the reason why the bulk of sawing is still done without a saw guide.

Much sawing is done also without the workman taking the trouble to make a pencil-line. For these reason, a speedy clampable guide is needed, and in my opinion, it needs to be produceable, also, at a low cost.

Some of the guides of the prior art have had no good way of getting sufficient pressure into the clamping. Others have assured clamping pressure, but have accomplished that feature only at the expense of high cost, many, many parts, and cumbersome operation.

Some prior art saw guide proposals will clamp with speed only to work-pieces of one size, but required slow-threaded adjustment to readjust them to a work-piece of substantially different size.

SUMMARY OF THE INVENTION

A saw guide assembly having a straight edge guide means attached to one of a pair of grip levers connected by a bolt and wing nut which latter, when tightened, assures clamping of a work-piece between the guide means and a pressing means, such as a spring, mounted on the other grip lever, the pressing means being resilient, as accomplished by an elongated arcuate spring having outer ends engageable with a work-piece and the spring, by its flexibility, permitting its outer ends to assume good engagement with the work-piece, even at various amounts of spacing of the spring and the guide means.

The grip of the wing nut being enhanced by an engageable pair of serrated means each fixed to one of the grip lever assemblies, and a lock washer cooperating with the wing nut.

The two grip lever assemblies each comprising a basic portion formed of a piece of sheet metal having flat sides.

The guide means also having a work-piece-engaging fast-alignment flange at a right angle to the saw guiding edge for fitting flush against a work-piece, providing automatic alignment of the saw guiding edge so no carpenter's square is needed and no pencil mark is needed for a straight 90°cut.

BRIEF DESCRIPTION OF THE DRAWING

FIG. 1 is a side elevation of a saw guide assembly of this invention shown as attached to a work-piece, the latter illustrated in dotted lines. Certain parts of the assembly are broken away, other parts shown in dotted lines.

FIG. 2 is a top plan view of the saw guide with a section of a flat plate portion broken away for showing the spring of a work-pressing section thereunder.

FIG. 3 is a view looking rearwardly at the work-pressing section from the forward side thereof.

FIG. 4 is a diagrammatic view of the wing bolt assembly and associated parts as seen from the rear thereof looking forwardly, with adjacent parts of the grip lever assemblies shown in cross-section.

FIG. 5 is a view of either one of the serrated friction fittings as seen along the line 5—5 of FIG. 4.

FIG. 6 shows in perspective view a broken away portion of the friction fitting of FIG. 5 taken from the area bounded by the line 6—6.

DESCRIPTION OF THE PREFERRED EMBODIMENT

The saw guide or saw guide assembly of this invention is generally indicated at 10 and comprises a guide means generally indicated at 12 comprising an alignment member 14 having a flat plate portion 20 which in most uses would be disposed horizontally and having a flat undersurface 22 for engaging the upper side of a work-piece, such as a piece of wood, shown in dotted lines at 24, which is to be cut.

Since most wooden items to be cut have a vertical edge, such as the edge 28 in FIG. 1, the alignment member 14 is provided with a work-piece engaging flange 40 having a work-piece engaging surface 42 for engaging the vertical surface 28 of the work-piece 24.

The flange 40 is formed of one piece with the flat plate portion 20 and the surface 42 is disposed in a vertical plane at a right angle to the horizontal plane of the undersurface 22 of the flat plate portion 20 of the alignment member 14.

The alignment member 14 has a rigid, straight right side saw guiding surface 50 on the right-hand side of the plate 20 and a second rigid, straight left side saw guiding surface 52 on the left-hand side of the plate portion 20. The saw guiding surface 50 and 52 are actually preferably disposed in planar right and left outer surfaces 62 and 64 of right and left vertical planar saw-guide flanges 70 and 72, respectively. The saw guiding surfaces 50 and 52 and the flanges 70 and 72 are both disposed at right angles to the planar work-piece edge engaging planar surface 42, whereby the flanges 70 and 72 are adapted to guide the edge of a saber saw, or the housing of any power saw, as it is moved across the work-piece 24 during the cutting of a work-piece at a right angle to the edge 28 of the work-piece.

A pair of elongated lever assemblies are generally indicated at 100 and each has a central portion 102 and the latter are disposed in parallelism with each other and are secured together by a wing bolt assembly generally indicated at 120 and which comprises a threaded shank 122 having a head 124 permanently fixed to the outer side of an adjacent one of the lever assemblies 100, such as by welding 132, to the left lever 142 of one of the left one of the lever assemblies 100.

A threaded shank 122 extends through the left lever 142 and then through left serrated washer or friction fitting means or member 154 which is attached to the left lever 142 by welding at 158 and then through a right serrated washer or friction fitting means 164, and then through a right lever 172, which latter is part of the right lever assembly 100. The right friction fitting 164 is attached by welding 178 to the right lever 172.

On the opposite side of the levers 142 and 172 from the bolt-head 124 is a wing-nut 200 threaded to the bolt 122. A lock washer 210 is on the threaded shank 122 between the wing-nut 200 and the right lever 172.

In FIG. 5, the inner most surface of either one of the serrated friction fittings 154 and 164 is there shown, since they both look alike on their inner surface and each are provided with serrations 230, best seen in FIG. 6, so that the serrations 230 of one of the friction fittings 154 engages the serrations 230 of the other of the friction fittings 164 to prevent rotation of the lever assemblies 100 with respect to each other at times when the wing bolt assembly 120 is tight.

The friction fitting 154 has an opening 232 through it at its center for receiving the bolt shank 122.

Referring to FIG. 2, the forward end 250 of the left lever assembly 100 is suitably secured, such as by welding 252, to the upper side of the flat plate portion 20 of the alignment member 14 of the guide means 12.

Referring to FIG. 3, a pressing means 260 is there shown and can also be called a pressing means assembly 260 and comprises a spring 262 which is elongated in the direction transverse to and preferably at a right angle to the length of the right lever assembly 100 to the forward end 272 of which the spring 262 is attached by welding 270.

The elongated spring 262 is arcuate, having a generally concave upper side and particularly having a central section 274 which is arcuate and concave on its upper side, yet having end portions 275 which extend in directions such that their uppermost surfaces are disposed somewhat downwardly bent with respect to the inclination of adjacent portions of the arcuate central portion 274 whereby the portions 275 engage a work-piece first upon clamping.

Referring to FIGS. 1 and 2, it will be seen that each of the lever assemblies 100 has a basic portion 210 formed of a piece of sheet metal stock having flat, parallel side surfaces, whereby central sections 340 of the basic portions 210 are disposed adjacent the axis 123 of the bolt shank 122 and are disposed with their adjacent sides in parallelism, as best seen in FIG. 2.

The forward end sections 250 and 272 of the respective basic portions 210 are disposed substantially in planes at a right angle to the planes in which the central portions 340 lie.

Each basic portion 210 has an intermediate section 352 which is disposed between its respective forward section 250 or 272, such intermediate sections being twisted to an angle of 90°.

Each of the basic portions 210 also has a rearward section 382, each of which latter receive thereon one of a pair of tubes 470 which are suitably attached thereto.

Each tube 470 is provided with an end cap 472 attached to it.

Each basic portion 210 can be further provided with a twisted portion 476 disposed between its central section 340 and its rearward section 382.

All sections of the basic portions 210 are made from the same one piece of material respectively.

In operation, of particular importance is the possibility of fast alignment because the work-piece-engaging fast-alignment flange 40 is pressed against the adjacent edge 28 of the work-piece thereby immediately and automatically aligning the saw guiding surface 50 at a right angle to the work-piece edge 28.

For this reason, no carpenter's square is needed and no pencil mark is necessary and a straight 90° cut can be made with great speed because of the fast clamping action of the levers 100 as rigidly set by the thumb nut 200 and maintained in an even more fixed way because of the serrations 230.

As described, it will be seen that the saw guide assembly of this invention is especially useful for flat-sided workpieces, such as workpiece of rectangular shape in cross-section, as seen in dotted lines at 24 in FIGS. 1 and 2.

The pressing means assembly 260 of FIG. 3 can be seen in FIG. 1 to be disposed opposite the guide means 12 and disposed in what can be called one direction from the guide edge 50, namely, the downward direction when the parts are shown in use position in FIG. 1. It may be helpful to term the workpiece-engaging flange 40 as a workpiece-engaging positioning flange means 40, since its serves to position the guide on the work. The positioning flange means 40 can be considered to have forwardmost portions, which latter engage the work and which are spaced apart a substantial distance in a direction normal to the guide edge 50 for positioning the assembly with stability against twisting as pressure is applied onto the workpiece.

The saw guide assembly 10 is free of any impediment means disposed in a plane so closely adjacent to the saw guide edge 50 as to be located where a saw blade of any width would be interfered with by the impediment means, not shown, all as seen in FIGS. 1 and 2.

I claim:

1. A saw guide assembly for flat-sided workpieces comprising a guide means having a rigid straight saw guiding surface, a pair of elongated lever assemblies, means pivotally connecting central portions of said lever assemblies together for rotation about an axis transverse to said straight saw guiding surface, certain portions of said lever assemblies being disposed generally on a same side of said axis when said levers are in approximate parallelism and defining rearward portions thereof respectively and serving as handles, the opposite ends of said lever assemblies each extending generally forwardly, the forward end of one of said lever assemblies being attached to said guide means, a pressing means mounted on the forward end of the other of said lever assemblies, said pressing means having pressing surface means disposed opposite said guide means, said rearward portions of said lever assemblies being grippable in the hand of an operator to force them toward each other so as to simultaneously force said pressing means toward said guide means so as to be able to grip a workpiece disposed therebetween, clamping means operably correlated with said lever assemblies for clamping said lever assemblies laterally together into fixed positions with respect to each other, a workpiece engaging positioning flange means extending from said guide means, said flange means having a forwardly facing workpiece engaging surface having forwardmost portions disposed substantially on a flange means plane arranged parallel to said axis and at a right angle to said saw guiding surface, outermost portions of said flange means forwardmost portions being spaced apart a substantial distance in a direction normal to said saw guiding surface for positioning said assembly with stability against twisting as pressure is applied onto said workpiece, said assembly being free of any impediment means disposed in a plane so closely adjacent to said saw guiding surface as to be located where a saw blade of any width would be interfered with by said impediment means.

2. The saw guide assembly of claim 1 in which said clamping means and said pivotal connecting means are together defined by a wing bolt assembly having a threaded shank fixed and projecting from one of said lever assemblies, said wing bolt assembly having a wing nut fixed on said threaded shank and cooperative therewith for pressing said lever assemblies toward each other.

3. The saw guide assembly of claim 1 further comprising a pair of serrated friction fittings attached one to each of said lever assemblies, said fittings having serrated surfaces disposed opposite each other and engaging each other at times when said wing bolt assembly is in a clamping relationship.

4. The saw guide assembly of claim 1 in which said pressing means comprises an arcuate elongated spring having a generally concave upper side, said spring being disposed transverse to the length of said other lever assembly, means attaching a central section of said spring to the forward end of said other lever assembly.

5. The saw guide assembly of claim 1 in which said lever assemblies each have a basic portion formed of a piece of sheet metal having central sections disposed adjacent said axis which latter are in parallelism, forward end sections of said basic portions being disposed substantially in planes at a right angle to said central sections.

6. The saw guide assembly of claim 5 in which intermediate sections of said basic portions are disposed between said forward sections and said central sections of said basic portions and are twisted through 90°.

7. The saw guide assembly of claim 5 in which each of said basic portions has a rearward section, a pair of tubes each disposed around and attached to a respective one of said rearward sections of said basic portions.

8. The saw guide assembly of claim 7 in which a pair of end caps are attached to the rearward ends of said tubes.

9. The saw guide assembly of claim 1 in which said guide means has a flat-bottomed plate portion and in which said saw guiding surface and said positioning flange means are all formed of a single piece of material with said plate portion.

10. The saw guide assembly of claim 1 in which said guide means has another rigid straight saw guiding surface disposed in parallelism with the first mentioned straight saw guiding surface and on the opposite side of said guide means therefrom, said other saw guiding surface bearing a similar relationship to other parts of the saw guide assembly as described herein above.

* * * * *